(12) United States Patent
Huo et al.

(10) Patent No.: US 12,099,863 B2
(45) Date of Patent: Sep. 24, 2024

(54) ISOLATING VIRTUAL MACHINE WORKLOADS WITHIN PODS IN A CLUSTER ENVIRONMENT

(71) Applicant: International Business Machines Corporation, Armonk, NY (US)

(72) Inventors: Qi Feng Huo, Beijing (CN); Wen Yi Gao, Beijing (CN); Si Bo Niu, Beijing (CN); Sen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 17/352,494

(22) Filed: Jun. 21, 2021

(65) Prior Publication Data
US 2022/0405112 A1    Dec. 22, 2022

(51) Int. Cl.
*G06F 9/46*      (2006.01)
*G06F 9/455*     (2018.01)
*H04L 69/163*    (2022.01)

(52) U.S. Cl.
CPC ........ *G06F 9/45558* (2013.01); *H04L 69/163* (2013.01); *G06F 2009/45587* (2013.01); *G06F 2009/45595* (2013.01)

(58) Field of Classification Search
CPC ....... G06F 9/45558; G06F 2009/45587; G06F 2009/45595; H04L 69/163
See application file for complete search history.

(56) References Cited

U.S. PATENT DOCUMENTS

| | | | |
|---|---|---|---|
| 10,379,922 B1* | 8/2019 | Bell | G06F 11/0712 |
| 10,476,845 B2 | 11/2019 | Antony et al. | |
| 10,944,691 B1 | 3/2021 | Raut et al. | |
| 11,567,794 B1* | 1/2023 | Emelyanov | G06F 9/45558 |
| 11,669,365 B1* | 6/2023 | Aithal | G06F 9/5027 |
| | | | 718/102 |
| 2011/0131573 A1* | 6/2011 | Antony | G06F 13/385 |
| | | | 718/1 |
| 2018/0373505 A1 | 12/2018 | Engquist et al. | |
| 2019/0075191 A1* | 3/2019 | Kunii | H04J 3/047 |
| 2019/0222444 A1* | 7/2019 | Sreeramaneni | H04L 25/03057 |
| 2019/0306022 A1* | 10/2019 | Shimoga Manjunatha | |
| | | | H04L 41/0813 |
| 2020/0073692 A1 | 3/2020 | Rao et al. | |
| 2020/0252376 A1 | 8/2020 | Feng et al. | |
| 2020/0356397 A1 | 11/2020 | Kumatagi et al. | |

(Continued)

OTHER PUBLICATIONS

Peter Mell et al., "The NIST Definition of Cloud Computing", NIST, Special Publication 800-145, Sep. 2011, 7 pages.

(Continued)

*Primary Examiner* — Tammy E Lee
(74) *Attorney, Agent, or Firm* — CANTOR COLBURN LLP; Edward Wixted

(57) ABSTRACT

Aspects include providing isolation between a plurality of containers in a pod that are each executing on a different virtual machine (VM) on a host computer. Providing the isolation includes converting a data packet into a serial format for communicating with the host computer. The converted data packet is sent to a router executing on the host computer. The router determines a destination container in the plurality of containers based at least in part on content of the converted data packet and routes the converted data packet to the destination container.

20 Claims, 9 Drawing Sheets

(56) References Cited

U.S. PATENT DOCUMENTS

2020/0403860 A1* 12/2020 Lewis ................ H04L 41/0806
2021/0359879 A1* 11/2021 Yang ...................... H04L 45/66

OTHER PUBLICATIONS

Aaron Conole et al: Open vSwitch Documentation Open vSwitch Developers. Jan. 7, 2017 SP055479376. p. 3 to p. 5.
Anonymous: "Kata Containers and VSOCKS", Jul. 23, 2020, 3 pages.
International Search Report and Written Opinion for Application No. PCT/EP2022/066193; International Filing Date: Jun. 14, 2022; Date of Mailing: Oct. 6, 2022; 12 pages.
Perez Martin Eugenio: "Deep-Dive into Virtio-networking and whost-net", Aug. 11, 2020, pp. 1-14.
Randazzo Alessandro et al: Kata Containers: An Emerging Architecture for Enabling MEC Services in Fast and Secure Way. 2019 Sixth International Conference on Internet of Things: Systems, Management and Security (IOTSMS), IEEE, Oct. 22, 2019 pp. 209-214 XP033676628.

* cited by examiner

ISOLATING VIRTUAL MACHINE WORKLOADS WITHIN PODS IN A CLUSTER ENVIRONMENT

BACKGROUND

The present invention relates generally to computer processing, and more specifically, to isolating virtual machine (VM) workloads within pods in a cluster environment.

A cluster environment includes a group of servers and other resources that act like a single system and that can be used to provide high availability and, in some cases, load balancing and parallel processing. A cluster infrastructure provides the basic functions for a group of computers, or nodes, to work together as a cluster. Cluster infrastructure code executes on nodes in the cluster to perform functions such as cluster management, lock management, fencing, and cluster configuration management.

Containers isolate an application and its dependencies into a self-contained unit that can be moved from one computing environment to another. A container includes an entire runtime environment, including an application and all of its dependencies, libraries, and other binaries, as well as configuration files needed to run the application, all bundled into one package. Rather than running an entire complex application inside a single container, the application can be split into modules (such as the database, the application front end, etc.).

Kubernetes®, available from The Linux Foundation®, is an example of a commercially available product that can be utilized to provide a framework, or cluster infrastructure code, for clustering and managing groups of nodes, each group referred to as a pod, that are executing workloads that include containers. In contemporary cloud environments Kubernetes pods are made up of multiple containers that use namespace to enforce isolation between pods. Namespace-based isolation can have advantages in terms of start-up time and efficiency, however security sensitive users may have security concerns with namespace-based isolation due to it providing poor isolation between containers within a pod. Contemporary approaches that utilize namespace-based isolation do not isolate containers within the same pod, and containers within the same pod can communicate directly with each other. This lack of isolation can become a security issue if the code of one container in a pod exhibits errors or is malicious as it may do harm to other containers in the pod and/or to the host that is executing the pod.

SUMMARY

According to one or more embodiments of the present invention, computer-implemented methods are provided for isolating virtual machine (VM) workloads within pods in a cluster environment. A non-limiting example computer-implemented method includes providing isolation between a plurality of containers in a pod that are each executing on a different virtual machine (VM) on a host computer. Providing the isolation includes converting a data packet into a serial format for communicating with the host computer. The converted data packet is sent to a router executing on the host computer. The router determines a destination container in the plurality of containers based at least in part on content of the converted data packet and routes the converted data packet to the destination container.

One or more embodiments of the present invention are directed to a system for isolating VM workloads within pods in a cluster environment. A non-limiting example of the system includes one or more processors for executing computer-readable instructions, the computer instructions controlling the one or more processors to perform operations that may include the above method.

One or more embodiments of the present invention are directed to a computer-program product for isolating VM workloads within pods in a cluster environment. A non-limiting example of the computer-program product includes a computer-readable storage medium having program instructions embodied therewith. The program instructions are executable by one or more processors to cause the one or more processors to perform operations that may include the above method.

Thus, advantageously, one or more embodiments of the present invention makes it possible to isolate every container within a VM in a pod, so that the resources of every container are isolated at the virtualization level. This also makes it possible for the workloads in pod to be enclaved. Another technical advantage is that the isolation can be performed without requiring changes to the applications being executed by the VM workloads. This allows the selection of either a VM or a runc container environment for executing an application depending on the security requirements of a particular user or implementation.

Additionally, or alternatively to the above, one of the plurality of containers in the pod is addressable from outside of the pod via an external internet protocol (IP) address. Thus, advantageously, ingress communications into the pod are routed via a single container in the pod.

Additionally, or alternatively to the above, the plurality of containers in the pod are addressable by the host computer at the same loopback IP address. Thus, advantageously, the containers in the pod can communicate with the host computer.

Additionally, or alternatively to the above, none of the containers in the pod are in direct communication with any of the other containers in the pod. Thus, advantageously, the containers in the pod are isolated from communicating directly with each other.

Additionally, or alternatively to the above, all of the communication between the plurality of containers in the pod are indirect communications via the router. Thus, advantageously, the containers in the pod are isolated from communicating directly with each other.

Additionally, or alternatively to the above, the destination container, upon receipt of the converted data packet, sends the data packet to an IP address outside of the pod that is specified by the converted data packet. Thus advantageously, egress communications to entities outside of the pod are routed via a single container in the pod.

Additionally, or alternatively to the above, prior to the converting, the data packet is in a TCP/IP format. Additionally, or alternatively to the above, the serial format is a vhost-vsock format Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
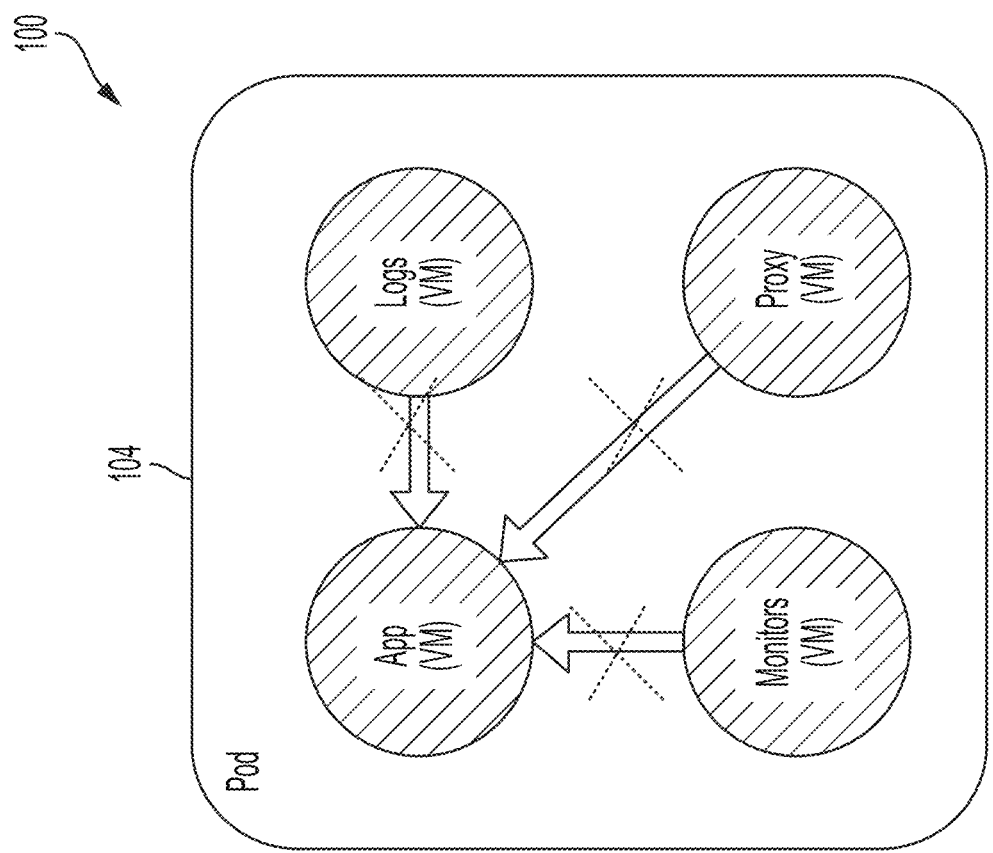
FIG. 1 depicts a block diagram of isolating containers within a cluster environment according to one or more embodiments of the present invention.
Figure 1:
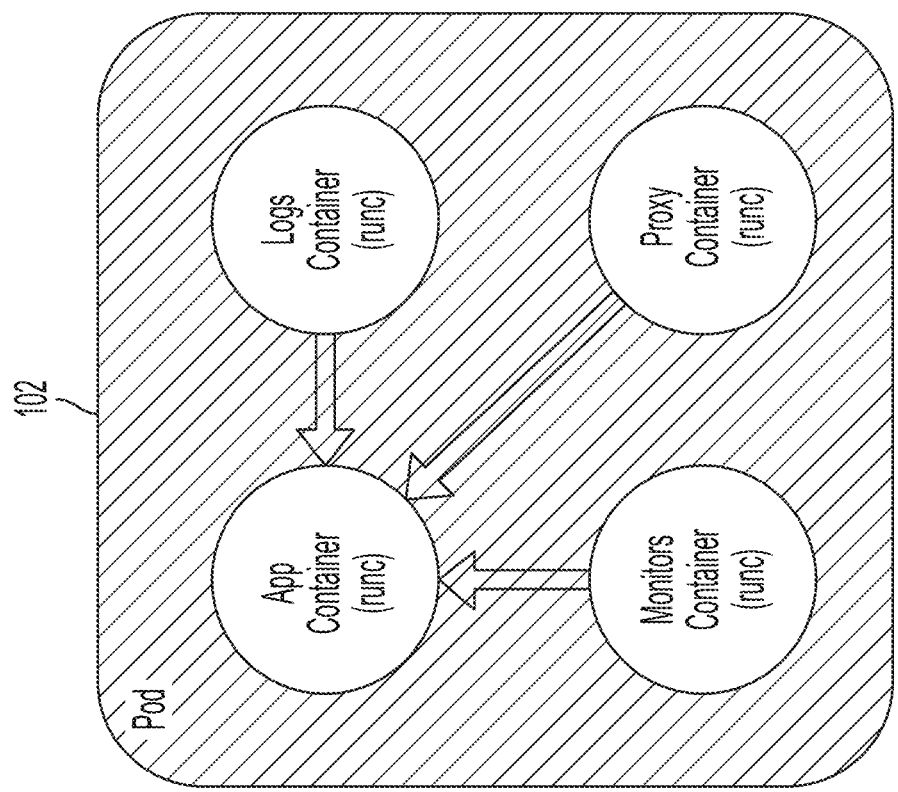

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide a network for isolating virtual machine (VM) workloads within pods in a cluster environment. The network allows every workload, or container, to be run within a VM and assigned an internal, or loopback, IP address only. A pause VM that represents the pod has an external IP address assigned and is reachable from outside the pod. Workload VMs, including the pause VM, can communicate with each other indirectly via a router on the local host. In this manner, all of the containers in the pod are isolated within a VM and they can also be orchestrated via application programming interfaces (APIs) such as open container initiative (OCI) and container runtime interface (CRI).

As described previously, Kubernetes is one example of a commercially available product that can be used to provide clustering and management of a group of containers within a pod. In a Kubernetes implementation, a pod can include multiple runc containers (lightweight universal container runtimes) with namespace being used to enforce isolation within the pod. This type of configuration provides isolation between pods but does not provide isolation between containers in the same pod.

In accordance with one or more embodiments of the present invention, a new network structure is provided that allows VM isolated containers within a pod to communicate with each other and the outside network (e.g., the internet) via a loopback internet protocol (IP) address. This new network structure requires no changes on the application layer to achieve uniformity of the code base and thus, the application doesn't have to modified to run the VM isolated containers. One or more embodiments of the present invention include multiple components in different layers of the stack including the hypervisor, the guest kernel, and customized drivers inside the guest operating system (OS) operating in the VM containers. One or more of these components together form a network that connects multiple VMs within a pod, both internally and externally, so that to an application executing in a VM container it appears the same as running in a runc runtime executing in a Kubernetes environment. This allows VM containers to communicate with each other via the local host.

As known in the art, a VM is an emulation of a physical computer. VMs enable the execution of what appears to be multiple machines, with multiple OSs, on a single host computer. An example VM architecture includes an underlying host system (hardware/infrastructure) which includes the physical machine and its OS, or host OS, a hypervisor which acts as a bridge between the hardware and the underlying infrastructure, multiple VMs that use the host's resources by communicating with the hypervisor, and applications and processes that run on each guest OS. A guest OS is an OS (e.g., Windows or Linux) that is installed onto a VM, and each guest OS runs in a separate VM. Hypervisors are used to separate, or isolate, VMs from one another and to allocate processors, memory, and storage of the host among the VMs.

One of more embodiment of the present invention include destination network address translation (DNAT) logic in a pause VM container to interpret ingress destination IP addresses, a router within a kernel-based VM (KVM) to proxy requests between VMs, a TCP/IP and serial communication protocol (e.g., vhost-vsock, virtio-serial) bridge, and a new driver in the guest OS to interpret TCP/IP packages. As known in the art, in Kubernetes implementations, a pause container provides a network interface accessible via an external IP address for communicating outside of the pod as well as an internal, or loopback, IP address for communicating with containers within the pod. The DNAT logic of one or more embodiments of the present invention maps a destination IP address of an incoming packet, or request, to a particular VM workload container within the pod and to its registered port.

In accordance with one or more embodiments of the present invention, the router (implemented in hardware and/or software) is located within a KVM and the router is responsible for managing the registration of each VM and its port. As known in the art, KVM is built into Linux and it is utilized to turn Linux into a hypervisor that allows a host machine to run multiple, isolated, virtual environments, referred to herein as guests or VMs. One of more embodiments of the bridge between a network communication protocol such as, but not limited to, TCP/IP and a serial protocol such as, but not limited to vhost-vsock, is utilized to convert the data packets, or requests, from/to formats utilized by the host OS and formats utilized by the guest OS. Vhost-vsock refers to a host/guest communication interface that allows applications in the guest OS and the host OS to communicate with each other. Vhost-vsock can provide communication directly between VMs and the host OS. In accordance with one or more embodiments of the present invention, a new driver in the guest OS for interpreting TCP/IP packets is utilized to translate the data packets copied from the bridge and to map them to the loopback address of the pod.

One or more embodiments of the present invention provide technological improvements over current methods of providing security in cluster environments that include containers. Current methods allow containers within a pod to communicate, or interact, directly with other containers within the pod. A disadvantage of contemporary approaches that allow containers to communicate directly with each other is that the container code of one container within a pod may be malicious and do harm to other containers and/or to the host. Example embodiments of the present invention provide technical solutions to one or more of the above noted disadvantages of existing solutions by introducing a new network that makes it possible to isolate every container within a VM in a pod, so that the resources of every container are isolated at the virtualization level. This also makes it possible for the workloads in pod to be enclaved. Another technical advantage is that one or more embodiments of the new network can be implemented without requiring changes to the applications being executed by the VM workloads, that is the same application code can be executed in VM containers and runc containers. This allows the selection of either environment for executing the applications depending on the security requirements of a particular user or implementation.

It is to be understood in advance that although this disclosure refers to a Kubernetes embodiment, implementation of the teachings recited herein are not limited to Kubernetes embodiments. Rather, embodiments of the present invention are capable of being implemented in conjunction with any other type of container infrastructure code now known or later developed. Examples of other commercially available products that can be utilized by one or more embodiments of the present invention include, but are not limited to: Docker available from Docker Inc. and Apache Mesos available from Mesosphere, Inc.

Turning now to FIG. 1, a block diagram 100 of isolating containers within pods in a cluster environment is generally shown in accordance with one or more embodiments of the present invention. All or a portion of the processing described in reference to block diagram 100 of FIG. 1 can be performed, for example, by computer system 900 of FIG. 9 and/or by one or more of the cloud computing nodes 10 and/or cloud computing devices 54A-N of FIG. 7.

Pod 102 of FIG. 1 is an example of a contemporary pod implemented using Kata that includes four runc containers: "App Container", "Logs Container", "Proxy Container", and "Monitors Container." In a configuration that uses Kata, such as that shown in pod 102, all of the containers within the pod 102 are executed within a single VM, and the containers are isolated via namespace and control groups. In pod 102, three of the containers ("Logs Container", "Proxy Container", and "Monitors Container") communicate directly with the "App Container."

Pod 104 of FIG. 1 is an example of a pod 104 that can be implemented by one or more embodiments of the present invention. Pod 104 includes four containers: "App", "Logs", "Proxy", and "Monitors", each executing in a different VM. One or more embodiments of the present invention prevent the containers in the pod 104 from communicating directly with any of the other containers in the pod 104. In pod 104, the containers can be isolated from each other via a hypervisor and a VM. The containers shown in FIG. 1 are referred to herein as "VM containers" or "VM workloads."

In Kubernetes implementations each pod (e.g., within a group of pods, or cluster) is assigned a unique IP address within the cluster. Within a pod, containers can reference each other directly but a container in one pod has no way of directly addressing another container in another pod. As used herein, the term "direct communication" refers to a communication between two entities, such as containers, that involves just the two entities and not a third entity such as another container or a router. In general, as used herein, the term "direct" when used to describe routing or sending or transmitting an element refers to routing the element (e.g., a data packet, or request) from one entity (e.g., a container) to another entity (e.g., a router) without an intermediary entity (e.g., another container or processing element or router). In contrast, the term "indirect" when used herein to describe routing or sending or transmitting an element refers to routing the element via an intermediary entity (e.g., a router).

VMs are configured so that applications run, or are executed, within a VM and each VM has its own IP address. In pod 104 of FIG. 1, each container is running its own VM (and applications are running within each VM) and each VM has its own unique IP address. In a container environment, each container within a pod is required to have the same local, or loopback, IP address so that the containers with the pod can communicate with each other. One or more embodiments of the present invention provide a new network that isolates the VM workloads, or containers, and complies with the requirement that all containers within a pod 104 have the same internal, or loopback, IP address, however the containers within the pod are not in direct communication with each other. In addition, in accordance with one or more embodiments of the present invention, all of the containers within the pod 104 are accessible via a single external IP address and port on one of the containers within the pod 104 (referred to herein as a "pause container" or "pause VM workload").

For ease in description, the pods 102 and 104 shown in FIG. 1 include four containers. One skilled in the art will recognize that a typical pod may include a single container or up to hundreds or thousands of containers.

Figure 2:
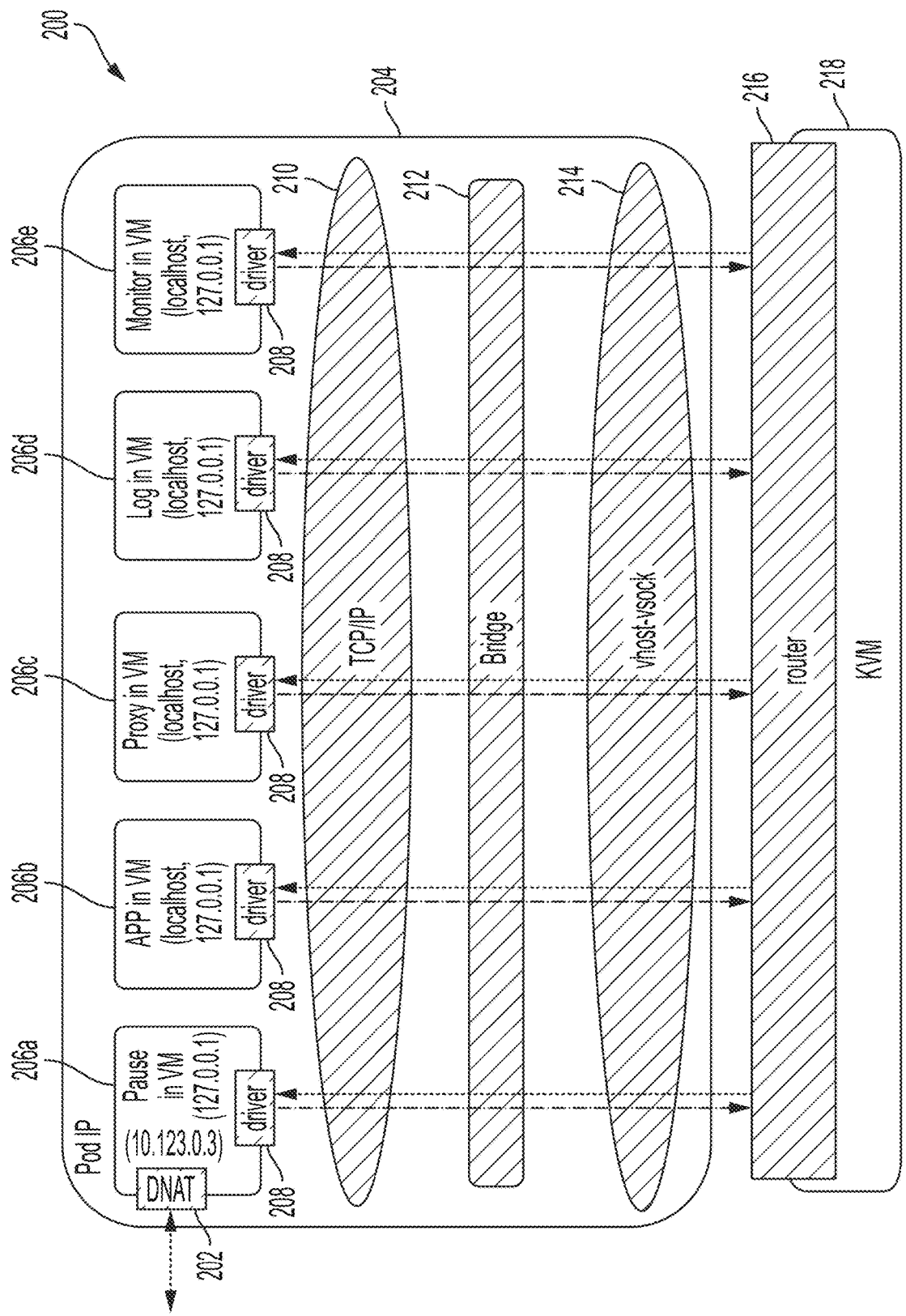
FIG. 2 depicts an illustration of an architecture for isolating virtual machine (VM) workloads within pods in a cluster environment according to one or more embodiments of the present invention.

Turning now to FIG. 2, an illustration of an architecture 200 for isolating VM workloads within pods in a cluster environment is generally shown in accordance with one or more embodiments of the present invention. All or a portion of the architecture 200 and processing described in reference to FIG. 2 can be located on or performed by, for example, computer system 900 of FIG. 9 and/or by one or more of the cloud computing nodes 10 and/or cloud computing devices 54A-N of FIG. 7. The architecture 200 shown in FIG. 2 includes a pod 204 executing VM workloads 206 and a KVM 218 that includes a router 216 executing on a host computer. Pause in VM workload 206a, Application in VM workload 206b, Proxy in VM workload 206c, Log in VM workload 206d, and Monitor in VM workload 206e are referred to collectively herein as VM workloads 206. Each of the VM workloads 206 are a separate isolated VM executing on the host computer and managed by the KVM 218. Each of the VM workloads 206 shown in the pod 204 is assigned a localhost, or loopback, IP address (127.0.0.1) and includes a driver 208 for facilitating the repackaging of data packets from TCP/IP 210 to vhost-vsock 214 via a bridge 212. The driver 208 also sends the data packet, in its repackaged format directly from a VM workload 206 to/from the router 216 in the KVM 218.

As shown in FIG. 2, an ingress request from outside the pod 204 is received at a port at an external IP address (in the example in FIG. 2, the external IP address is 10.123.0.3) which is located on Pause in VM workload 206a. A data packet associated with the request is input to DNAT 202. As shown in FIG. 2, Pause in VM workload 206a is the only container in the pod 204 that is reachable from outside of the pod 204 via an external IP address. In accordance with one or more embodiments of the present invention, the DNAT 202 has rules, in table format for example, that translate the external IP address into the internal IP address (in the example in FIG. 2, the internal IP address is 127.0.0.1). The driver 208 in the Pause in VM workload 206a sends the data packet, or request, directly to the router 216. The router 216 determines a destination VM workload 206 of the data packet and sends the data packet directly to the destination VM workload 206 for processing. In this manner, direct communication between the VM workloads 206 in the pod 204 is disabled in order to provide isolated VM workloads 206 in the pod 204. The communication between the VM workloads 206 is indirect because it is via the router 216.

Also as shown in FIG. 2, a request may be received from a VM workload 206 in the pod 204 to send a data packet to a location outside of the pod 204. In this case, the VM workload 206 sends the data packet directly to the router 216 and the router 216 sends the data packet directly to the Pause in VM workload 206a for egress from the pod via the port addressable via the external IP address (in the example in FIG. 2, the external IP address is 10.123.0.3). Additionally, a request may be received from a VM workload 206 in the pod 204 to send a data packet to another VM workload 206 in the pod 204. In this case, the VM workload 206 sends the data packet directly to the router 216 and the router 216 sends the data packet directly to the other VM workload 206.

The architecture 200 shown in FIG. 2, where the VM workloads 206 communicate with each other via the router 216 executing on the host machine is contrasted with contemporary approaches where the VM workloads 206, or containers, communicate with each other directly via TCP/IP. Isolation between the VM workloads 206 in the pod 204 is provided by one or more embodiments of the present invention by disabling direct communication between the VM workloads 206 and using the router 216 to route data packets between the VM workloads 206.

Figure 3:
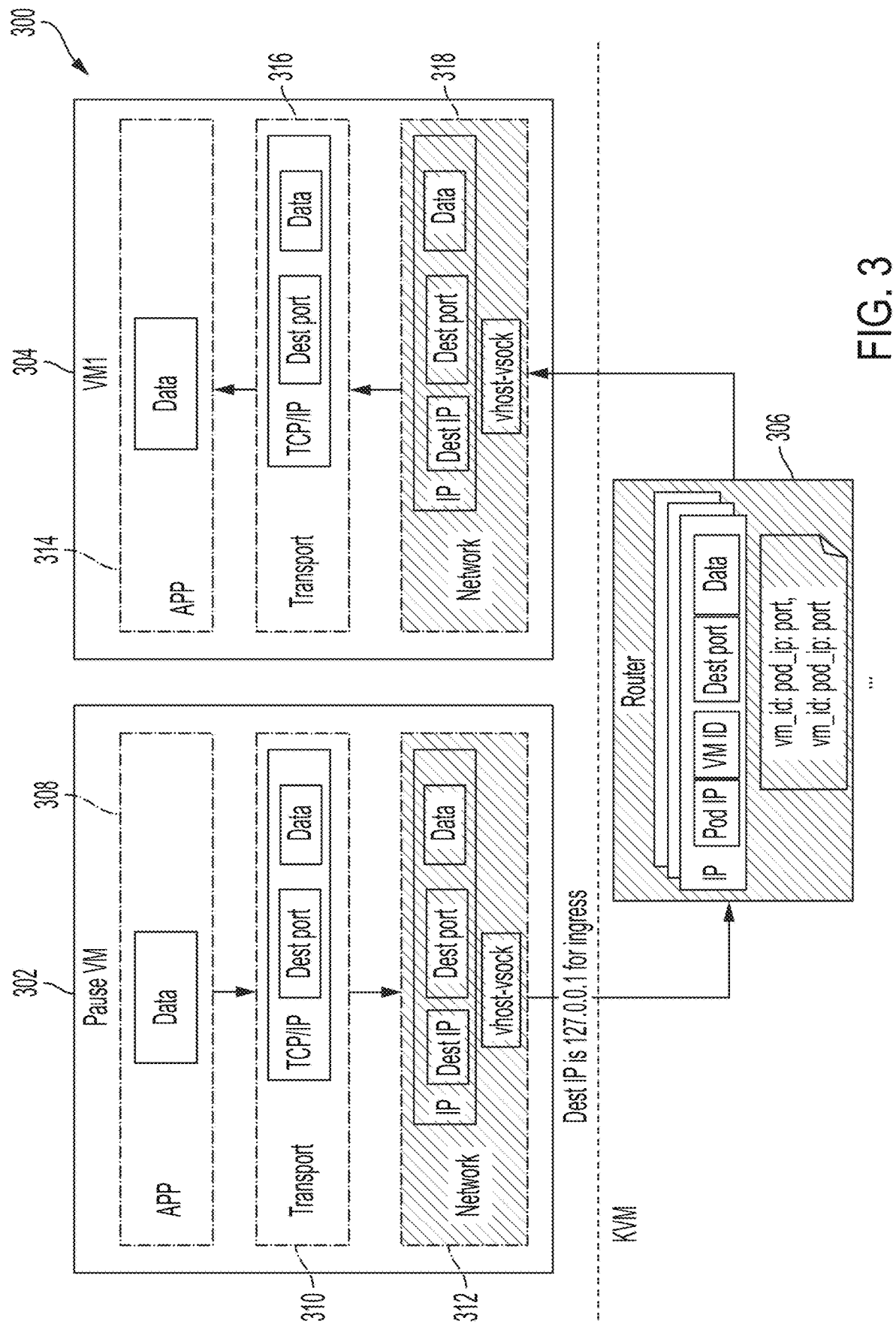
FIG. 3 depicts a block diagram of a method for receiving and routing an ingress request in a system that isolates VM workloads within pods in a cluster environment according to one or more embodiments of the present invention.

Turning now FIG. 3, a block diagram 300 of a method for receiving and routing an ingress request in a system that isolates VM workloads within pods in a cluster environment is generally shown in accordance with one or more embodiments of the present invention. All or a portion of the processing described in reference to the block diagram of FIG. 3 can be performed, for example, by computer system 900 of FIG. 9 and/or by one or more of the cloud computing nodes 10 and/or cloud computing devices 54A-N of FIG. 7. The block diagram 300 in FIG. 3 depicts a Pause VM workload 302, a VM1 workload 304, and a router 306. The Pause VM workload 302 and the VM1 workload 304 are in the same pod.

In accordance with one or more embodiments of the present invention, the processing of an ingress request includes receiving a data packet at the Pause VM workload 302 via an external IP address. As shown in FIG. 3, a TCP/IP data packet is received in the application layer 308 of the Pause VM workload 302. The transport layer 310 of the Pause VM workload 302 identifies a destination port ("Dest Port") and a data portion ("Data") of the data packet. At the network layer 312, the TCP/IP data packet is repackaged into a vhost-vsock packet and then sent to a router 306 on the host computer. As shown in the network layer 312 of the pause VM workload 302 of FIG. 3, the loopback IP address of the pod is added to the data packet as the destination IP address ("Dest IP"). In accordance with one or more embodiments of the present invention, the adding of the destination IP address is performed by DNAT 202 of FIG. 2, and the data packet is sent through the transport layer 310 to the network layer 312 by driver 208 of FIG. 2 via bridge 212 of FIG. 2.

The router 306 receives the vhost-vsock formatted data packet which as shown in the network layer 312 of the Pause VM workload 302 in the embodiment of FIG. 3 is an IP data packet that includes the destination IP address ("Dest IP" which is the loopback address of the pod), a destination port (Dest Port"), and data ("Data"). The vhost-vsock formatted packet is formatted in a serial protocol that allows a guest VM (e.g., Pause VM workload 302) to communicate with a host machine (e.g., via a hypervisor) which routes data packets based on a VM identifier such as "VM ID." The IP data packet, which is in vhost-vsock format is sent to the router 306. As shown in FIG. 3, the router 306 determines that VM1 workload 304 is the destination VM workload based, for example, on the destination port contained in the data packet. In accordance with one or more embodiments of the present invention, the destination port is the IP address assigned to the VM executing the destination VM workload. In accordance with one or more embodiments of the present invention, the router 306 includes a table which converts the destination port and loopback address to a VM ID of the destination VM workload. In the example shown in FIG. 3, based on the table, the router 306 knows that the destination VM workload is VM1 workload 304. As shown in FIG. 3, "Pod IP" is the loopback address copied from the "Dest IP" in the packet in the network layer 312.

As shown in FIG. 3, the router 306 sends an IP packet which includes the loopback address of the pod ("Dest IP"), destination port ("Dest Port") and data ("Data") to the network layer 318 in the destination VM1 workload 304. The network layer 318 converts the data packet back into a TCP/IP packet as shown in the transport layer 316 of the destination VM1 workload 304. The data portion of the TCP/IP packet is sent to the application layer 314. As shown in FIG. 3, an incoming data packet is sent directly from the Pause VM workload 302 to the router 306, and the router sends the data packet directly to the destination VM1 workload 304. This process, which indirectly sends (e.g., via a router 306 on the host machine) an ingress data packet from the Pause VM workload 304 to the destination VM1 workload 304 provides isolation between the Pause VM workload 302 and the destination VM1 workload 304.

A similar process is performed when a VM workload has internal data that it wants to share with another VM workload in the pod. In accordance with one or more embodiments of the present invention the process includes converting a TCP/IP data packet generated by the VM workload into a serial protocol data packet, sending the serial data packet to the router, routing the serial data packet to a destination VM workload where the serial data packet is converted into a TCP/IP data packet for processing by the application(s) executing on the destination VM workload. In this manner, the data can be sent indirectly (via the router) between The processing described in reference to FIG. 3 is not intended to indicate that the operations are to be executed in any particular order, or that all of the operations shown in FIG. 3 are to be included in every case. Additionally, the processing shown in FIG. 3 can include any suitable number of additional modules for performing additional operations. Further, the modules shown in FIG. 3 can be arranged differently.

Figure 4:
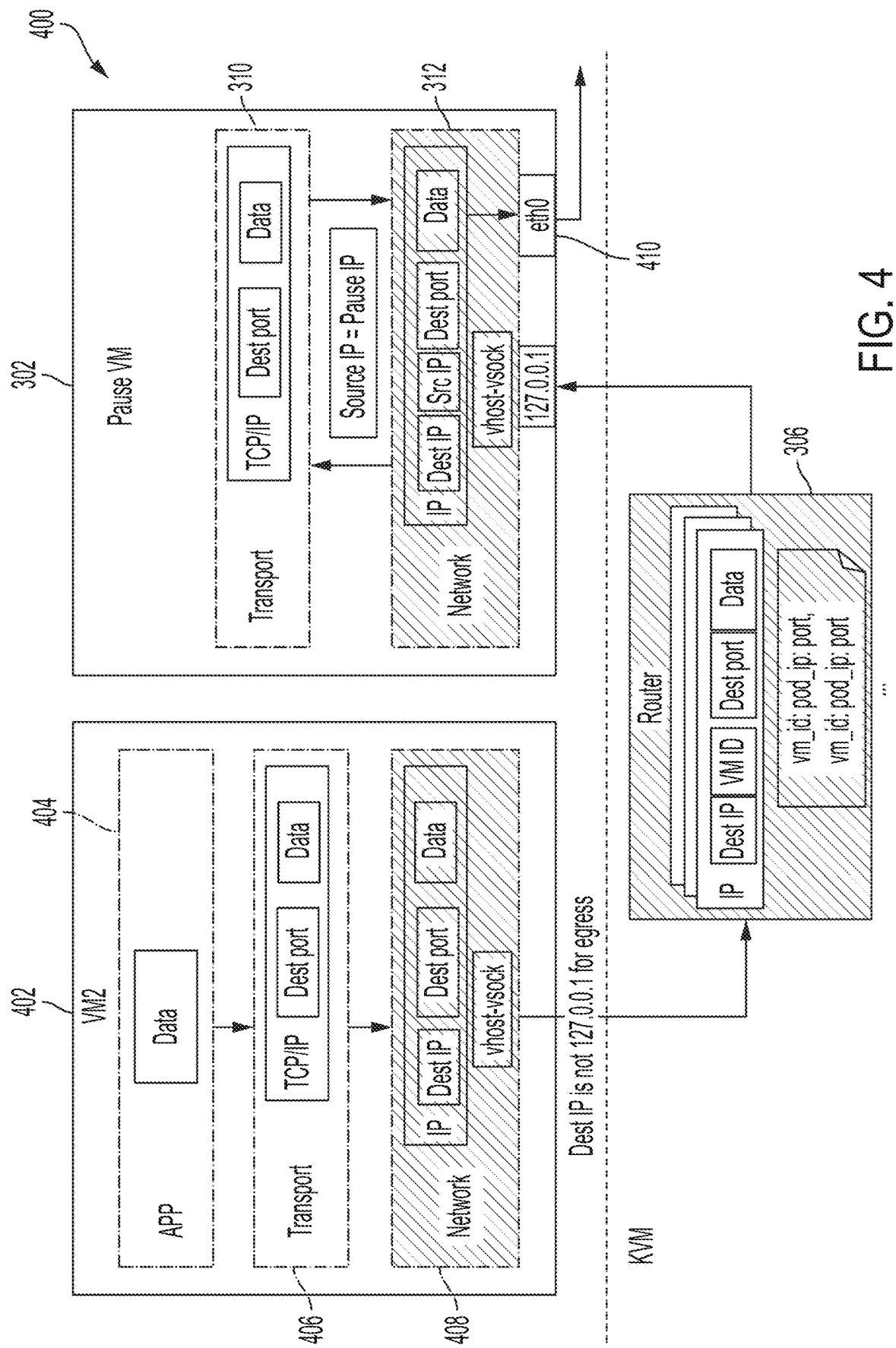
FIG. 4 depicts a block diagram of a method for routing and transmitting an egress request in a system that isolates VM workloads within pods in a cluster environment according to one or more embodiments of the present invention.

Turning now to FIG. 4, a block diagram 400 of a method for routing and transmitting an egress request in a system that isolates VM workloads within pods in a cluster environment is generally shown in accordance with one or more embodiments of the present invention. All or a portion of the processing described in reference to the block diagram of FIG. 4 can be performed, for example, by computer system 900 of FIG. 9 and/or by one or more of the cloud computing nodes 10 and/or cloud computing devices 54A-N of FIG. 7. The block diagram 400 in FIG. 4 depicts Pause VM workload 302, VM2 workload 304, and router 306. The Pause VM workload 302 and the VM12workload 304 are in the same pod.

In accordance with one or more embodiments of the present invention, the processing of an egress request includes sending a data packet to a location outside of the pod from a source VM workload, in the example embodiment show in FIG. 2 the source VM workload is VM2 workload 402. As shown in FIG. 4, data is generated in the application layer 404 of source VM2 workload 402. The transport layer 406 of source VM2 workload 402 adds a destination port ("Dest Port") to the data received from the application layer 404 to generate a TCP/IP data packet. In this example, where the data packet is to be sent outside of the pod, the destination IP address is an IP address outside of the pod and is not the loopback IP address of the pod. At the network layer 408, the TCP/IP data packet is repackaged into a vhost-vsock packet and sent to a router 306 on the host computer. The router 306 recognizes that the destination IP address does not refer to a container within this pod and it routes the data packet in vhost-vsock format to the Pause VM workload 302 for converting the data packet into a TCP/IP format and sending the data packet to the destination IP address specified in the IP data packet. The network layer 312 of the Pause VM 302 specifies that the source IP address ("Src IP") is the external IP address of the Pause VM 302. The data packet is then sent by the Pause VM workload 302 to the destination IP address specified by the destination port in the TCP/IP formatted data packet. As shown in FIG. 4, the data packet exits the pod via network interface 410 on the pause VM workload 302.

The processing described in reference to FIG. 4 is not intended to indicate that the operations are to be executed in any particular order, or that all of the operations shown in FIG. 4 are to be included in every case. Additionally, the processing shown in FIG. 4 can include any suitable number of additional modules for performing additional operations. Further, the modules shown in FIG. 4 can be arranged differently.

Figure 5:
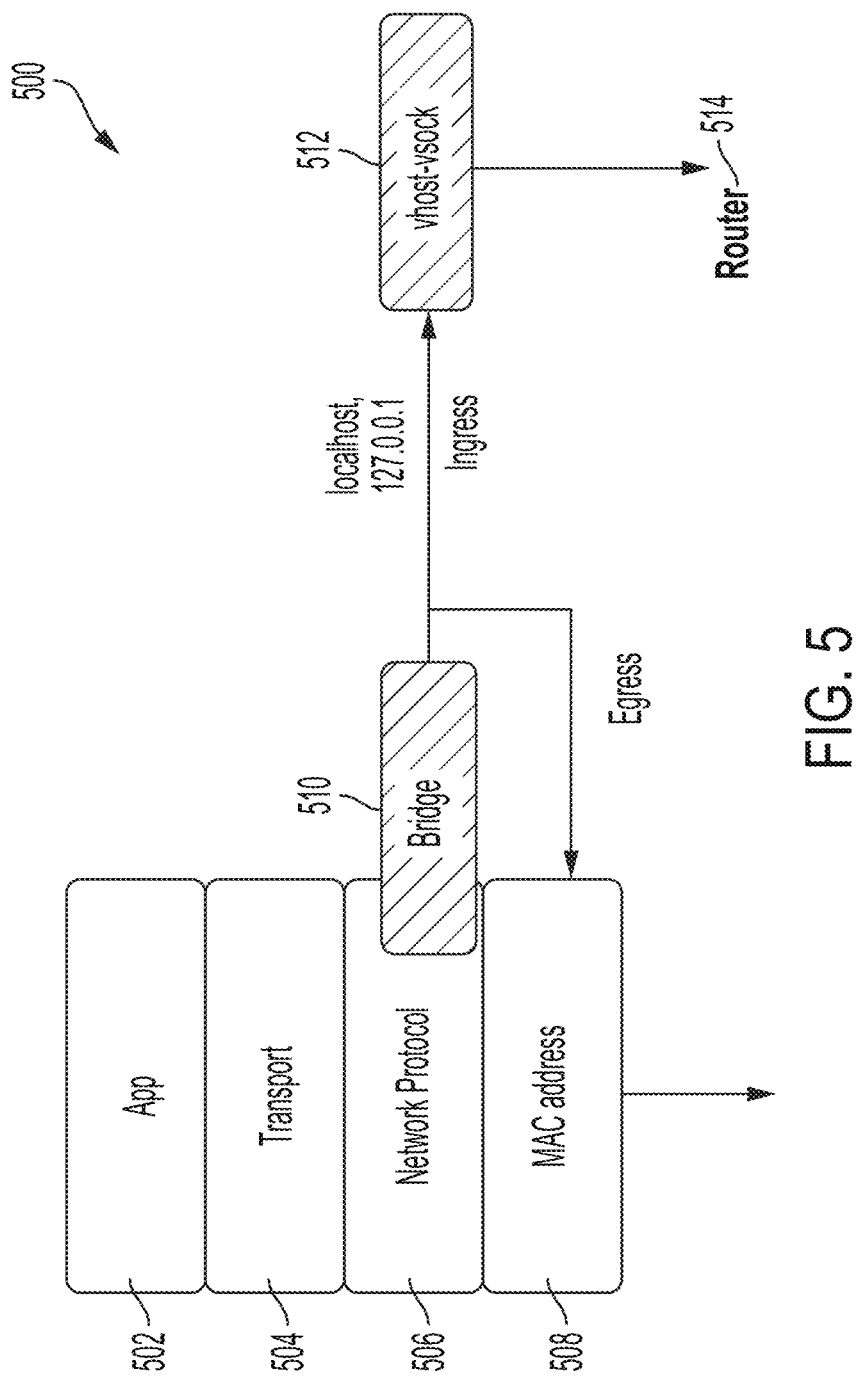
FIG. 5 depicts a block diagram of a pause VM in a system that isolates VM workloads within pods in a cluster environment according to one or more embodiments of the present invention.

Turning now to FIG. 5, a block diagram 500 of a pause VM in a system that isolates VM workloads within pods in a cluster environment is generally shown in accordance with one or more embodiments of the present invention. A pause container in Kubernetes is a container that holds the network namespace for the pod. Pause containers are used to acquire the respective pod's IP address and to set up the network namespace for all other container that join the pod. The pause VM shown n FIG. 5 has an IP address for communication outside of the pod, transfers ingress requests to other VMs in the pod, and transfers egress requests from other VMs in the pod to a location outside of the pod. The pause VM shown in FIG. 5 includes an application layer 502 (e.g., an application executing in the pause VM), a transport layer 504, a network protocol layer 506, and a MAC address 508. The pause VM shown in the block diagram 500 of FIG. 5 also includes a bridge 510 that can transfer the TCP/IP packets of the egress requests out of the pod via a MAC address if the destination address is not 127.0.0.1, or the local host. The bridge 510 is also used for ingress requests to convert a TCPI/IP packet into a vhost-vsock packet 512 which is a format that the router 514 executing on the host machine can use to identify the destination VM workload. The ingress TCP/IP packets conversion happens when destination address is 127.0.0.1, or the local host.

Figure 6:
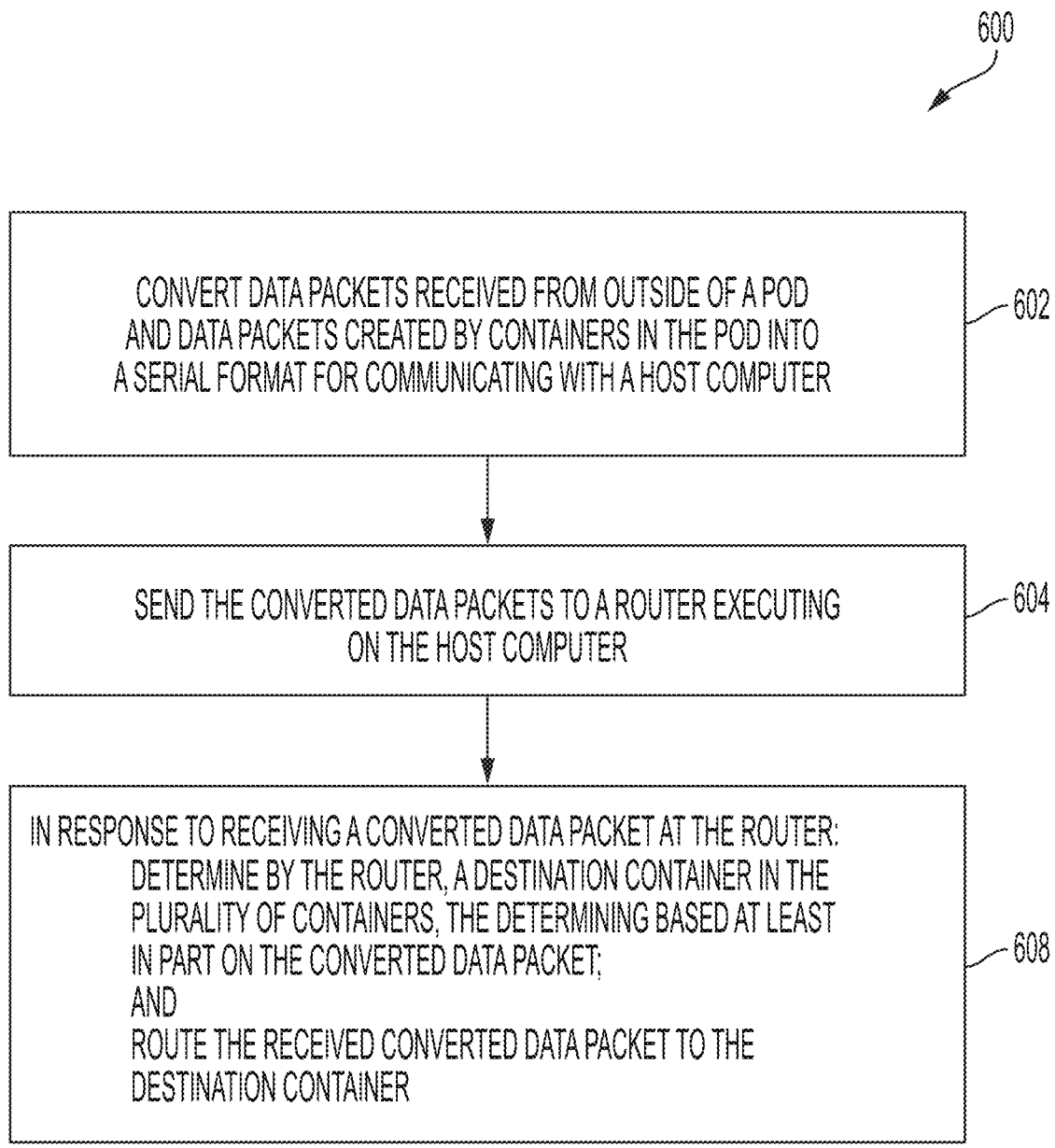
FIG. 6 depicts a flow diagram of a method for isolating VM workloads within pods in a cluster environment according to one or more embodiments of the present invention.

Turning now to FIG. 6, a flow diagram 600 of a method for isolating VM workloads within pods in a cluster environment is generally shown in accordance with one or more embodiments of the present invention. All or a portion of the processing described in reference to the block diagram of FIG. 6 can be performed, for example, by computer system 900 of FIG. 9 and/or by one or more of the cloud computing nodes 10 and/or cloud computing devices 54A-N of FIG. 7.

In accordance with one or more embodiments of the present invention, isolation is provided between a plurality of containers in a pod. In accordance with one or more embodiments of the present invention, the containers are VM workloads. Each of the containers in the pod are executing in a different VM on a host computer. At block 602 of FIG. 6, the system converts data packets received from outside of the pod and data packets created by containers into a serial format for communicating with the host computer. In accordance with one or more embodiments of the present invention, only one (or exactly one) of the containers, in the pod (the pause container, or pause VM workload) is addressable from outside of the pod via an external IP address. In addition, all of the containers in the pod are addressable at the same loopback address. In accordance with one or more embodiments of the present invention the received data packets are in a TCP/IP format and they are converted into a vhost-vsock format for communicating with the host computer.

At block 604, the converted data packets are sent to a router executing on the host computer. None of the containers in the pod are in direct communication with any of the other containers in the pod, and as such all communication between the containers in the pod is indirect via the router. At block 606, in response to receiving a converted data packet at the router, a destination container in the plurality of containers is determined by the router based at least in part on contents of the converted data packet, and the received converted data packet is routed to the destination container. Based on an IP address associated with the data packet, the data packet can get routed to a pause container that sends the converted data packet to an IP address that is external to the pod.

The processing described in reference to FIG. 6 is not intended to indicate that the operations are to be executed in any particular order, or that all of the operations shown in FIG. 6 are to be included in every case. Additionally, the processing shown in FIG. 6 can include any suitable number of additional modules for performing additional operations. Further, the modules shown in FIG. 6 can be arranged differently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
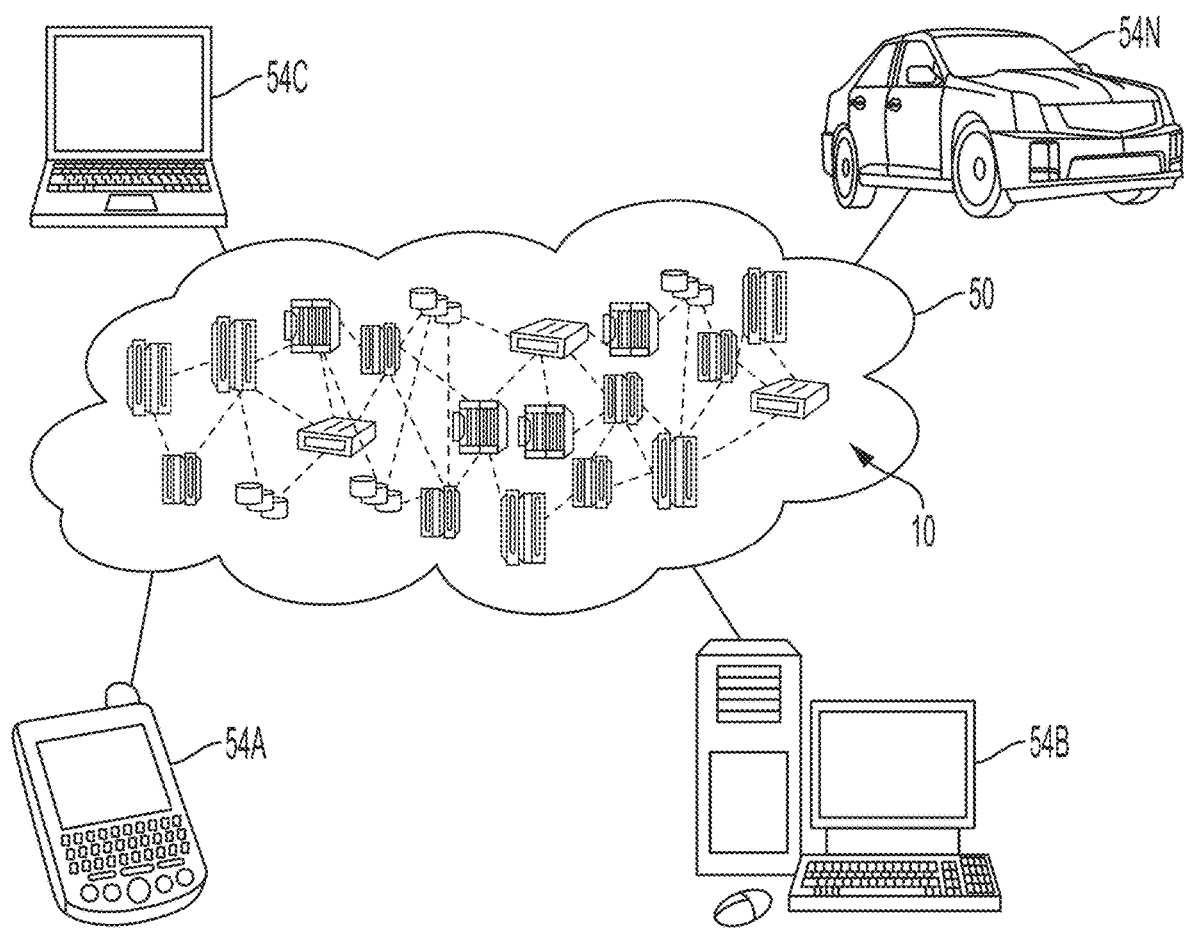
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
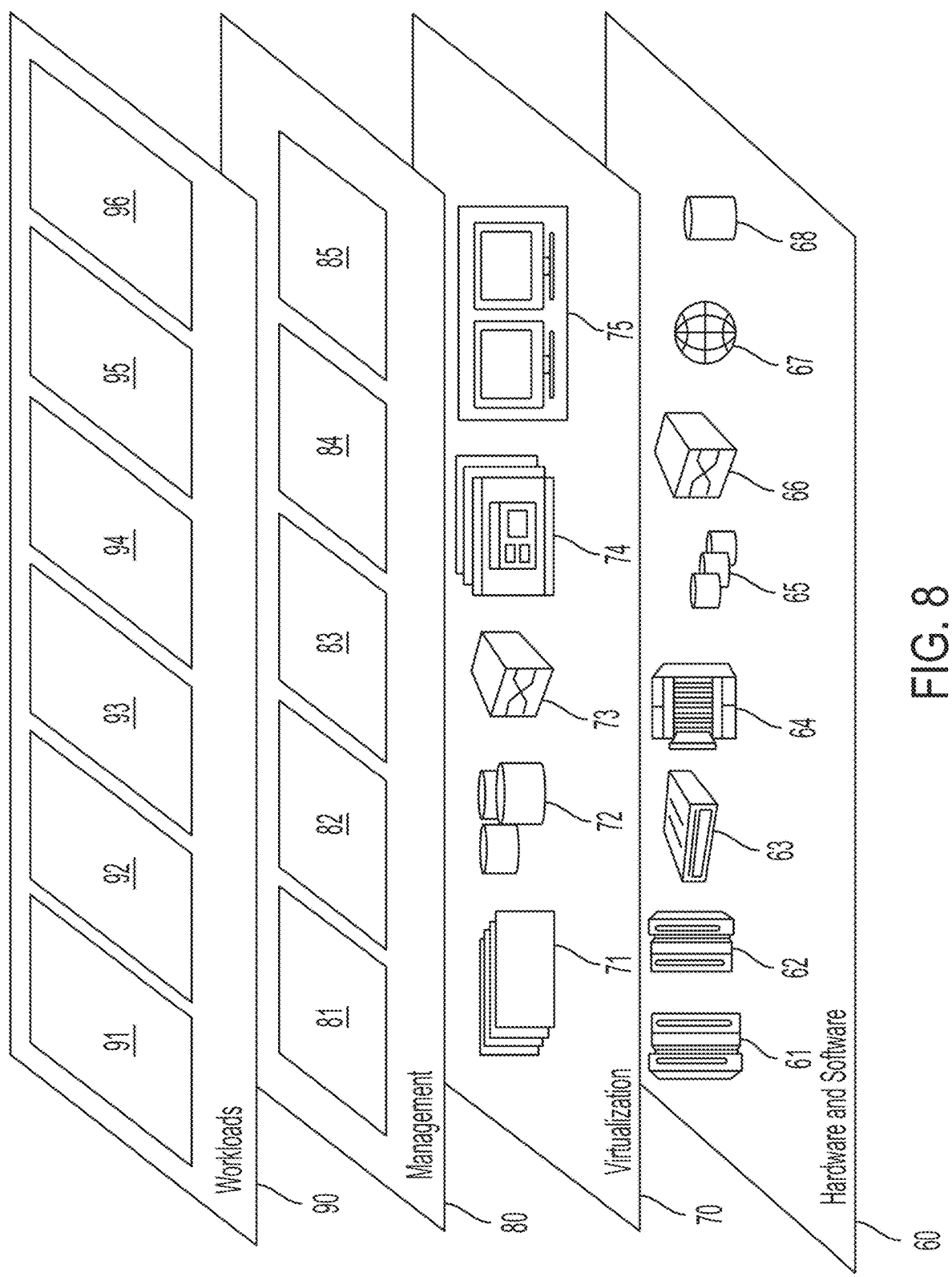
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 9:
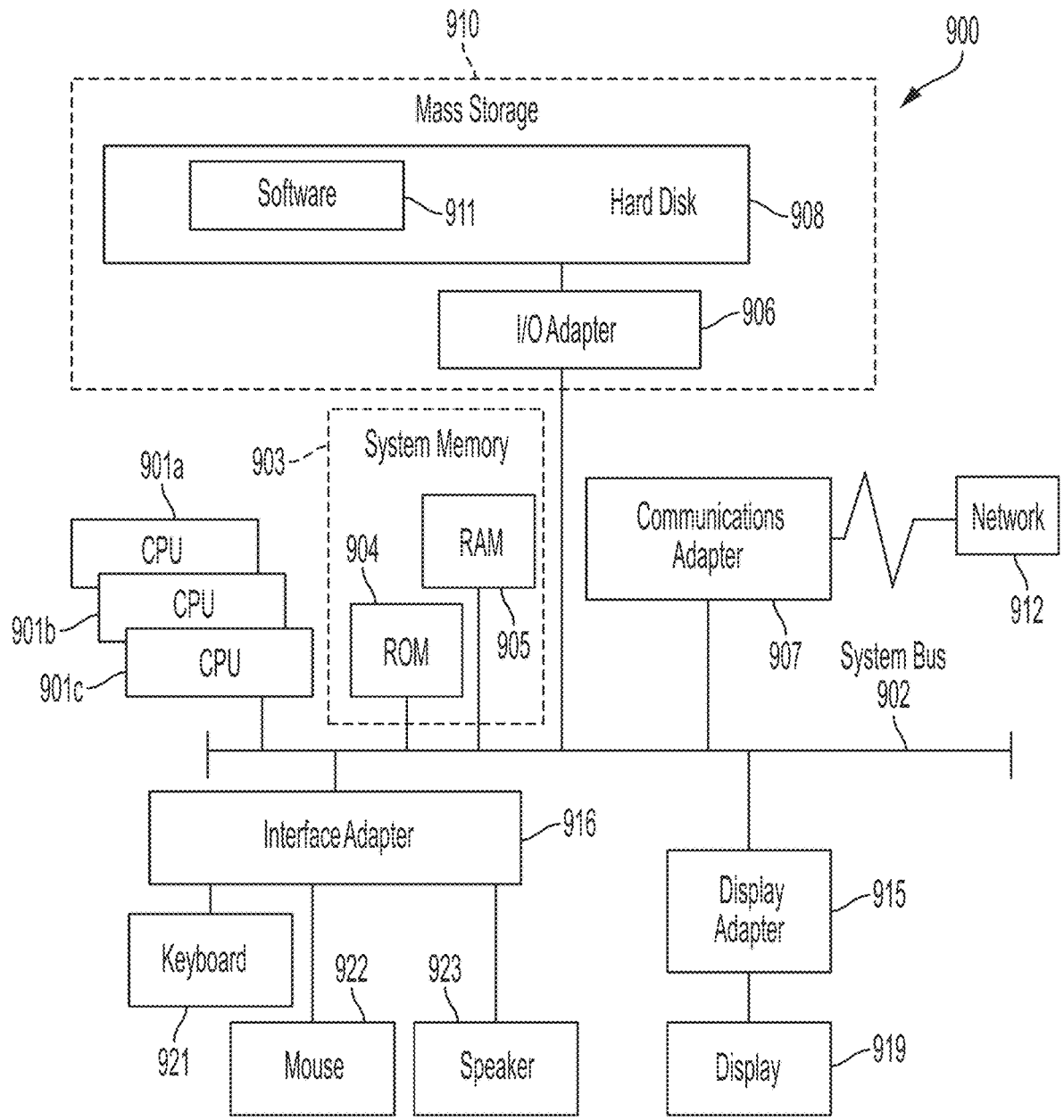
FIG. 9 depicts a processing system for isolating VM workloads within pods in a cluster environment that includes containers according to one or more embodiments of the present invention.

Turning now to FIG. 9, a computer system 900 is generally shown in accordance with an embodiment. All or a portion of the computer system 900 shown in FIG. 9 can be implemented by one or more cloud computing nodes 10 and/or computing devices 54A-N of FIG. 7. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node. Computer system 900 may be described in the general context of computer system executable instructions, such as program modules, being executed by a computer system. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 901). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a serial advanced technology attachment (SATA) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS® or AIX® operating system, to coordinate the functions of the various components shown in FIG. 9.

Additional input/output devices are shown as connected to the system bus 902 via a display adapter 915 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 900 includes processing capability in the form of the processors 901, and storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
providing isolation between a plurality of containers in a pod, wherein each of the plurality of containers are executing on a different virtual machine (VM) on a host computer, the providing isolation comprising:
converting a data packet into a serial format for communicating with the host computer; and
sending, by a first container of the plurality of containers, the converted data packet to a router executing on the host computer, wherein the router determines a destination container in the plurality of containers based at least in part on content of the converted data packet, and routes the converted data packet to the destination container,
wherein none of the plurality of containers in the pod have access to resources of other containers of the plurality of containers in the pod.

2. The method of claim 1, wherein one of the plurality of containers in the pod is addressable from outside of the pod via an external internet protocol (IP) address.

3. The method of claim 2, wherein the plurality of containers in the pod are addressable by the host computer at a same loopback IP address.

4. The method of claim 1, wherein none of the plurality of containers in the pod are in direct communication with any of the other containers in the pod.

5. The method of claim 1, wherein all of the communication between the plurality of containers in the pod are indirect communications via the router.

6. The method of claim 1, wherein the destination container, upon receipt of the converted data packet, sends the data packet to an IP address outside of the pod that is specified by the converted data packet.

7. The method of claim 1, wherein prior to the converting, the data packet is in a TCP/IP format.

8. The method of claim 1, wherein the serial format is vhost-vsock.

9. A system comprising:
one or more processors for executing computer-readable instructions, the computer-readable instructions controlling the one or more processors to perform operations comprising:
providing isolation between a plurality of containers in a pod, wherein each of the plurality of containers are executing on a different virtual machine (VM) on a host computer, the providing isolation comprising:
converting a data packet into a serial format for communicating with the host computer; and
sending, by a first container of the plurality of containers, the converted data packet to a router executing on the host computer, wherein the router determines a destination container in the plurality of containers based at least in part on content of the converted data packet, and routes the converted data packet to the destination container,
wherein none of the plurality of containers in the pod have access to resources of other containers of the plurality of containers in the pod.

10. The system of claim 9, wherein one of the plurality of containers in the pod is addressable from outside of the pod via an external internet protocol (IP) address.

11. The system of claim 10, wherein the plurality of containers in the pod are addressable by the host computer at a same loopback IP address.

12. The system of claim 9, wherein none of the plurality of containers in the pod are in direct communication with any of the other containers in the pod.

13. The system of claim 9, wherein all communication between the plurality of containers in the pod are indirect communications via the router.

14. The system of claim 9, wherein the destination container, upon receipt of the converted data packet, sends the data packet to an IP address outside of the pod that is specified by the converted data packet.

15. The system of claim 9, wherein prior to the converting, the data packet is in a TCP/IP format.

16. The system of claim 9, wherein the serial format is vhost-vsock.

17. A computer program product comprising a computer-readable storage medium having program instructions embodied therewith, the program instructions executable by one or more processors to cause the one or more processors to perform operations comprising:
providing isolation between a plurality of containers in a pod, wherein each of the plurality of containers are executing on a different virtual machine (VM) on a host computer, the providing isolation comprising:
converting a data packet into a serial format for communicating with the host computer; and
sending, by a first container of the plurality of containers, the converted data packet to a router executing on the host computer, wherein the router determines a destination container in the plurality of containers based at least in part on content of the converted data packet, and routes the converted data packet to the destination container,
wherein none of the plurality of containers in the pod have access to resources of other containers of the plurality of containers in the pod.

18. The computer program product of claim 17, wherein one of the plurality of containers in the pod is addressable from outside of the pod via an external internet protocol (IP) address.

19. The computer program product of claim 18, wherein the plurality of containers in the pod are addressable by the host computer at a same loopback IP address.

20. The computer program product of claim 17, wherein none of the plurality of containers in the pod are in direct communication with any of the other containers in the pod.

* * * * *